United States Patent [19]

Hess

[11] Patent Number: 5,482,216
[45] Date of Patent: Jan. 9, 1996

[54] METHOD FOR RECLAIMING PLASTIC WHICH CONTAINS UNDESIRABLE CONTAMINANTS

[75] Inventor: Markus Hess, Thornhill, Canada

[73] Assignee: Alfa Loop Inc., Toronto, Canada

[21] Appl. No.: 49,376

[22] Filed: Apr. 21, 1993

[51] Int. Cl.⁶ .................................................. B02C 23/00
[52] U.S. Cl. ...................... 241/23; 241/29; 241/DIG. 38; 241/162; 264/DIG. 69
[58] Field of Search .................................. 241/14, 23, 29, 241/DIG. 38, 157, 161, 162, 163; 264/37, 177.17, 211.21, 271.1, DIG. 69; 425/241

[56] References Cited

U.S. PATENT DOCUMENTS

| | | |
|---|---|---|
| 3,421,405 | 1/1969 | Logrippo . |
| 4,185,784 | 1/1980 | Flita . |
| 4,187,352 | 2/1980 | Klobbie . |
| 4,607,797 | 8/1986 | Enikolopow et al. ..................... 241/23 |
| 4,626,189 | 12/1986 | Hammer et al. . |
| 4,824,627 | 4/1989 | Hammer et al. . |
| 4,860,958 | 8/1989 | Yerman ..................................... 241/23 |
| 4,874,566 | 10/1989 | Heuschkel . |
| 5,032,072 | 7/1991 | Heuschkel . |
| 5,035,189 | 7/1991 | Lunsford . |
| 5,110,055 | 5/1992 | Teeny ........................................ 241/23 |
| 5,225,137 | 7/1993 | Sadr ..................................... 241/23 X |

Primary Examiner—Timothy V. Eley
Attorney, Agent, or Firm—Neil H. Hughes; Ivor M. Hughes; Marcelo K. Sarkis

[57] ABSTRACT

A method for comminuting material (which in one example may be a plastic or non-plastic material) contained within a plasticized matrix with a machine comprising a mechanism for comminuting said non plasticized matrix and dispersing the material throughout the matrix. The mechanism has at least two separate stages (each stage preferably including stationary plates and non-stationary plates), which cooperate to shear the material and to distribute, disperse and comminute the material into finely comminuted material distributed and dispersed throughout the plasticized material. The finely comminuted material is substantially distributed throughout the plasticized matrix and is so small and so dispersed throughout the plastic so as not to degrade unduly any use to which the plasticized matrix when solidified may be put to or any further process being carried out with respect to the plastic matrix.

34 Claims, 13 Drawing Sheets

ENLARGED SECTION OF PLASTIC
FILM CONTAINING COMMINUTED
CONTAMINANTS

METHOD FOR RECLAIMING PLASTIC WHICH CONTAINS UNDESIRABLE CONTAMINANTS

FIELD OF INVENTION

This invention relates to a process for converting assumed waste plastics material, which is considered contaminated by plastics and non-plastics contaminating material for example containing contaminants which are difficult to detect and remove if present, and recovering the assumed waste plastics for reuse in commercially viable processes without the need for sorting, separating or cleaning the plastics from the contaminating materials considered to be present with the plastics material. This invention also relates to equipment and machinery useful in carrying out the process and the product of such process.

BACKGROUND OF THE INVENTION

One of the main problems in recovering any waste materials is the necessity of sorting the waste stream and separating for example plastic materials from non-plastic and different plastics contaminating materials or for example a desired plastic material from other plastic contaminating materials. For example when attempting to recover the plastics material in plastic bags returned to supermarkets, it has been found that such lots of bags returned may contain contaminants such as paper, fruit remnants, metal cans, bottle caps, packaging and other random materials. It is prohibitively expensive to sort these contaminating materials prior to reclaiming the plastic.

It has been proposed in the prior art in recovering plastic to add to the plastic as processed in a mixer a predetermined amount of refuse which has been dried and ground. An example of such a process is found in U.S. Pat. No. 5,035,189. Of course with this process the refuse must have been presorted dried and ground prior to being dispensed into the the mixer of the process. This luxury is not afforded generally in the real world and as such the teachings of U.S. Pat. No. 5,035,189 is only of particular application when one knows the constituents of the product streams. There is no discussion within this reference as to the encapsulation of each finally divided particle within the waste stream. Further the contaminating material which is undesirable does not arrive in a random manner.

Other examples of plastic recovery systems or components are found in U.S. Pat. No. 3,421,405, U.S. Pat. No. 4,626,189, U.S. Pat. No. 4,824,627 and U.S. Pat. No. 4,187,352. Like U.S. Pat. No. 5,035,189 all of these references require knowledge of the product streams; that is to say none of the contaminating material arrives randomly with the plastics material to be recovered or reclaimed.

Applicant is also aware of U.S. Pat. No. 4,874,566 issued Oct. 17, 1989 and U.S. Pat. No. 5,032,072 issued Jul. 16, 1991 and claiming priority from U.S. Pat. No. 4,874,566, being a divisional thereof, and teaching the processing of thermoplastics received in a non cleaned and non sorted state. The final output of said method or process includes molded finished product. Applicant is also aware of U.S. Pat. No. 4,185,784 which teaches the use of a roller extruder device which crushes non plastic waste carried in the plastic received. No comminuting to a fine grind of the undesirable contaminants is taught however in either reference.

Nowhere within the prior art is there taught the handling of unsorted contaminated plastic materials wherein the method and the process includes steps and an apparatus for comminuting plastics material, having undesirable contaminants therewith, while said plastics material is in a plasticized state. This process provides a distribution of the contaminants within the plasticized material and hence the final products recovered and contaminants of a much reduced particle size so as not to affect unduly further processing or use, of the recovered or reclaimed plastics material in a commercially viable process. This process is therefore superior to any process or method or machine found in the prior art.

It is therefore an object of the invention to provide a process for recovering plastic materials that is considered waste because it is considered to have unsorted undesirable contaminants associated therewith (for example contained therein) wherein the output of said processing includes finely dispersed particles of the contaminants encapsulated within the recovered plastics material which contaminants do not adversely affect the ability to further process the recovered or reclaimed plastics material into viable products.

It is a further object of the invention to provide a method for accomplishing the above objective, and the finished products of both the method and the process.

It is yet a further object of the invention to provide an apparatus, machinery and components therefore for comminuting plastics materials having carried therewith undesirable contaminants, the comminuting of the refuse occurring while the plastic is in a plasticized state.

Further and other objects of the invention will become apparent to those skilled in the art when considering the following summary of the invention and the more detailed description of the preferred embodiments illustrated herein.

SUMMARY OF THE INVENTION

According to one aspect of the invention there is provided a method for reclaiming, recovering waste plastic, for example plastic bags, which may contain randomly undesirable contaminants (for example cans, food remnants, paper, cigarette butts, (metal or plastic) bottle caps, packaging or the like), said method comprising:

(a)i in one embodiment grinding the plastic as received onsite, or in another embodiment having the material ground offsite, to a predetermined particle size so as to grind both the plastic and the contaminants randomly contained with the plastic, or (a)ii receiving the material in an as is condition, (b) accumulating said waste plastic, (preferably in a feed hopper, so as to provide a substantially continuous flow of the waste plastic), (for example so as to minimize the amount of air fed with said material to an extruder), (c) heating and pressurizing said material within an extruder, (preferably a twin screw extruder with flights rotating in opposite directions), the extruder being preferably vented to extract unwanted gases, to a predetermined temperature and pressure so as to plasticize said plastic within which said contaminants are contained, (d) delivering, for example extruding, said plasticized plastic material containing said contaminants to a comminuting device, and preferably an apparatus having devices (and preferably plates), at least one of which moves relative to another, for example moving in relation to one another (and preferably alternate plates rotating relative to stationary plates), each of the devices having means to allow passage of plasticized material, and preferably openings therein preferably of substantially equal size, wherein said plasticized plastic material containing said contaminants passes consecutively through means to allow passage of plasticized material thereby mixing the plasticized material and at the same time shearing the contaminants progressively, thus comminuting each of said contaminants to a very fine predetermined particle size, preferably to less than 20 mesh, thereby providing finely disbursed particles of the contaminants of predetermined size throughout the plasticized plastic material, (e) preferably collecting and preferably in one embodiment pelletizing said plasticized plastic containing said finely comminuted and divided contaminants to provide feed stock for any further plastic handling or forming process such as a film line or a molding process, wherein said plastic material contains finely comminuted and divided contaminants within the plastic, each finely divided particle of waste material being encapsulated by plastic and being sufficiently dispersed or separated from one another so as not to affect unduly, for example weaken, any product made from the plastic. In a preferred embodiment said pellets are used to manufacture plastic bags and wherein each particle of contaminant is randomly dispersed throughout the plastic of the bag without unduly effecting the strength of the plastic bag and it's ability to retain its expected contents in use and preferably the plastic bags being manufactured by said method are plastic garbage bags. In another embodiment said pellets are used as raw material for a molding process to manufacture articles normally molded from thermoplastic material.

According to yet another aspect of the invention there is provided a process for recycling recyclable plastics contaminated with undesirable contaminant materials, said process comprising means for accumulating unsorted waste plastic material, in one embodiment in communication with a first grinding means for grinding said waste plastic material containing contaminants and the contaminants to a predetermined size, extruding means for heating and pressurizing said plastics and contaminants to a predetermined temperature and pressure to plasticize said waste plastic material and contaminants and extruding the material from said extruding means, the plastic waste in a plasticized state and containing said contaminants, and when no grinding apparatus is present said extruding means preferably being a twin screw extruder with two or more flights rotating within the barrel in opposite directions to one another to thereby reduce the size of the waste handled without prior grinding, comminuting means for receiving said waste from the extruding means and comminuting the plastic and contaminants while still in a plasticized state thereby reducing the particle size of the contaminants and distributing said contaminants within said plasticized plastic so as not to affect unduly the plastics products produced or any further process being carried out, said plasticized plastic and contaminants exiting said comminuting means as a mixture, preferably collecting and in one embodiment preferably pelletizing said matrix of the plastic and contaminants, means to collect and preferably pelletize said mixture accumulated for use as feed stock to a plastic forming process, and wherein the particles of finely divided contaminant are encapsulated with plastic and so widely distributed from one another within the plastic that the presence of the finely ground contaminants do not unduly affect, for example weaken, the final product being made from the material or any further process being carried out. In a preferred embodiment the output of said process is used for the manufacture of plastic bags and wherein each particle of waste is so finely distributed (separate) from others so as not to unduly affect the plastic bag structure, preferably wherein said bag making process is a garbage bag manufacturing process.

In a preferred embodiment said means for comminuting said plasticized plastic further comprises a machine having a housing, said housing having a space defined therein wherein a driven shaft is disposed, said housing and driven shaft for supporting a number of devices at least one of which is moveable relative to another (and in one embodiment said devices comprising stationary and non stationary plates, said stationary plates containing therebetween a non stationary plate driven by said shaft) wherein plasticized plastic material having carried therewith contaminants pass through openings within said devices resulting in the shearing of the contaminants as the plasticized matrix moves from openings of one device to openings in another device, and preferably when stationary and non-stationary plates are utilized through the openings between adjacent plates when aligned, by moving into relative alignment of the openings of one plate relative to the other, said shearing occurring of the plastic matrix carrying contaminants passing between the devices and preferably between non stationary and stationary plates. Preferably said machine includes a predetermined number of sets of stationary and non stationary plates, wherein the machine provides a mixture of plasticized plastic and finely ground contaminants as output from said machine.

According to yet another aspect of the invention there is provided a machine for comminuting a contaminating material (for example non-plastic and/or plastic material) contained within a plasticized (plastic) matrix, said machine comprising means for comminuting said contaminating material and dispersing said contaminating material throughout said plasticized matrix, said means for comminuting said contaminating material having at least one stage, each stage including first means and second means which cooperate to shear the plastic material and contaminating material proximate the portions of the first and second means adjacent one another, to disperse and comminute said contaminating material throughout the plasticized (plastic) matrix wherein the finely comminuted contaminating material is distributed throughout said plasticized material so as not to affect unduly, for example degrade, any use to which the plasticized material when solidified may be put or any further processing of the plasticized material to be carried out. In a preferred embodiment the finely comminuted contaminating material (whether plastic or non-plastic) distributed throughout said plasticized material will not unduly affect or degrade any use to which the plasticized material when solidified may be put. Because of the distribution of the contaminants in the plastic material and the small size of the contaminants the output of said machine can be used in the manufacture of plastic bags and preferably garbage bags.

In one embodiment said means for comminuting said plasticized plastic may further comprise a machine having a housing, said housing having a space defined therein wherein a driven shaft is disposed, said housing and driven shaft for supporting a number of plates at least one of which is moveable relative to another [in one embodiment including alternating stationary and non-stationary (for example rotatable or oscillating)] plates, said moveable plates being driven by said shaft, wherein plasticized plastic material having carried therewith contaminants passes through openings within said plates resulting in the shearing of the contaminants as the plasticized matrix moves through the means for comminuting for example from plate to plate to plate, said shearing occurring between relatively moveable plates, preferably said machine including a predetermined number of sets of plates so as to provide a mixture of plasticized plastic and contaminants of very fine size (for example each piece of contaminant being less than 0.50 inch) as output from said machine.

According to yet another aspect of the invention there is provided a plastic product comprising a matrix of plastic material which causes therein, preferably encapsulated therein, a comminuted finely sized randomly distributed amount of particles of undesirable contaminant material sized and spaced from one another so as not to affect unduly, for example degrade, the properties of any finished plastic product comprising such product or any further process being carried out employing such plastic matrix carrying the contaminants. Preferably said product is plastic film. In one embodiment said plastic film is utilized to manufacture garbage bags.

According to yet another aspect of the invention there is provided a product comprising a matrix of plasticizable and extrudable material which contains or carries, and preferably encapsulates, therein a comminuted finely sized randomly distributed amount of particles of undesirable contaminant material, the particles sized so as not to affect unduly, for example degrade, the properties of the finished product or any further process being carried out using that matrix.

In a preferred embodiment of the products referred to above the contaminants are less than about 20 mesh (0.050 in.).

In a preferred embodiment of the methods or processes identified above the contaminants are so fine that they do not plug the openings of film die's through which the plastic material carrying the comminuted contaminants pass for forming the film which film dies openings are usually in the range of 0.065–0.085 inches which if plugged would create a die line in the film manufactured if the contaminants were too coarse.

In a preferred embodiment of the processes described above the contaminants are ground so fine (in the order of 0.0015 in.) that they minimize the aspect of plugging the openings of film dies which openings are usually in the range of 0.065–0.085 inches which if plugged would create a die line in the film manufactured if the contaminants were too coarse.

BRIEF DESCRIPTION OF THE DRAWINGS

The invention will now be illustrated with reference to the following drawings illustrating embodiments of the invention in which.

DETAILED DESCRIPTION OF EMBODIMENTS OF THE INVENTION

Figure 1:
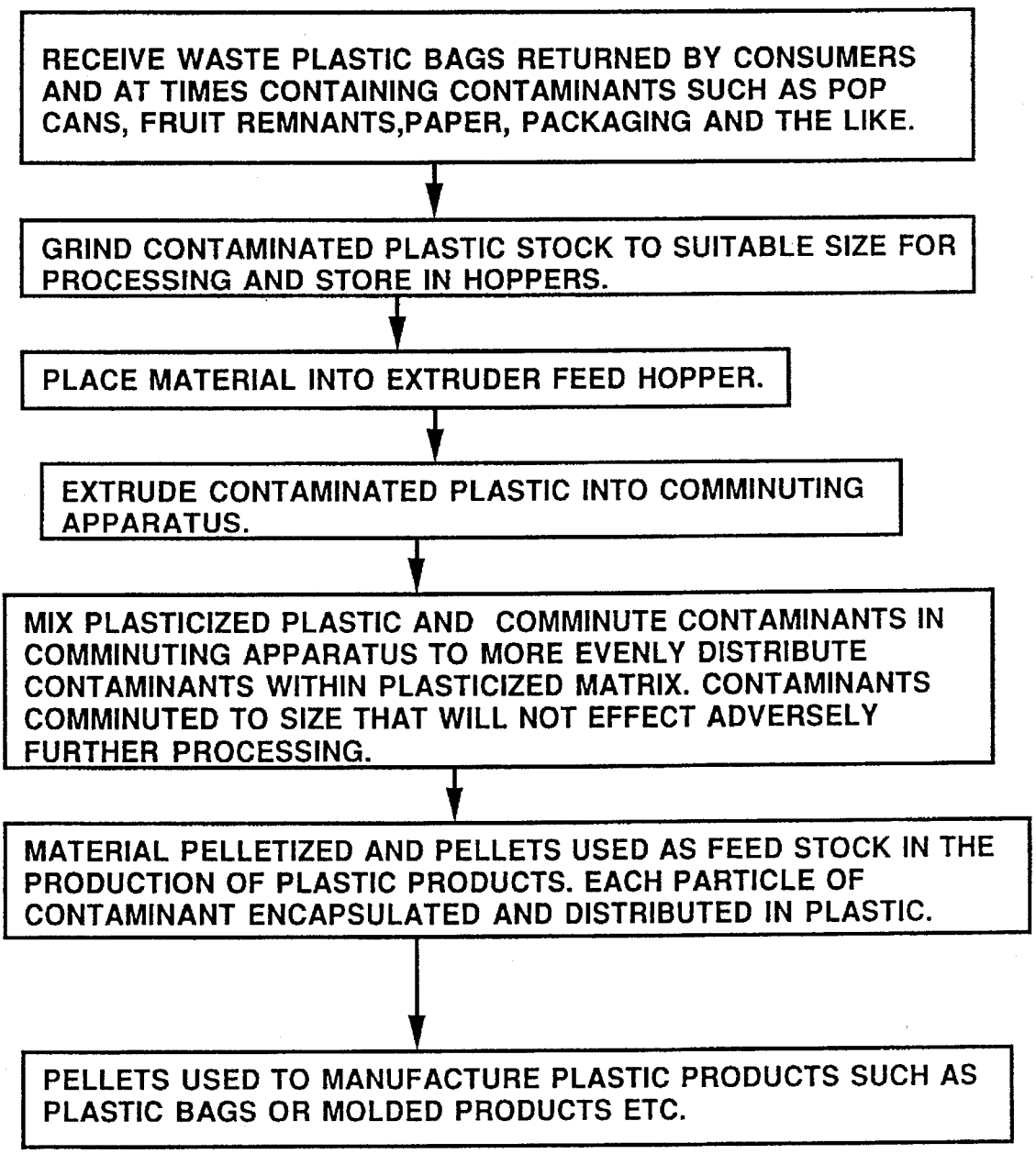
FIG. 1 is a flowchart indicating the steps within a method for reclaiming plastics materials considered (believed) to contain contaminants illustrated according to one preferred embodiment of the invention.

Referring generally now to FIG. 1 there is illustrated in a block diagram flow chart, a method of recovering waste polyethylene and making the waste polyethylene into a useful product. For example consumers purchase their groceries often in plastic bags supplied by the supermarket chain. These plastic bags are either thrown away or used around the household to collect waste and ultimately are an extra burden in the waste stream. Because polyethylene does not readily breakdown, many supermarkets, attempting to be good corporate citizens, will collect these bags. However the bags often arrive at the recycling depot containing pop cans, pieces of fruit, milk cartoons, bottle tops, metal, plastic, and other miscellaneous wastes. It is very difficult for the supermarket then to recycle these bags. In fact efforts have been made to do so without any success. Since in the manufacture of plastic film, used in plastic bags, film dies are used, it has been difficult to establish a method and the equipment to carry out a method of preventing the waste from plugging the die gaps of the film producing units or interrupting the film drawing process. The present invention therefore obviates this problem by providing means for reducing the particle size of the undesirable contaminants so as not to plug the die holes in for example a film producing line and thereby substantially reducing the presence of highly undesirable die lines. These die lines when present result in a need to completely rework the film made.

Milk is sold in polyethylene pouches, usually sold three to a poly bag, at supermarkets, convenience stores and the like. Dairies are usually required to retrieve from outlets any milk that is not sold in a predetermined period of time and dispose of the final product as well as the packaging. While the milk may be poured from the poly bags, generally the contaminated polybags are thrown away.

The method of FIG. 1 and all of the description in relation to FIGS. 1 to 9 includes the recycling of many types of plastic and particularly polyethylene and may be used for the recycling of waste bags. For example should the polyethylene be contaminated with polystyrene wherein a large percentage of the material stream is polyethylene then the polyethylene may be recovered using Applicant's method as well. The contaminants which are undesirable may also be thermoset plastics, that is the contaminants need not be metal, cardboard, cigarette butts, and food remnants, but may also be other types of plastic which are just as undesirable.

It is also been found that floor sweepings from plastic plants along with the normal accumulated dirt found on floors can also be recycled following the same method.

The present method has been carried out on combinations of materials which have been ground; for example a combination of 50% ground polyethylene bags containing no undesirable contaminants and 50% ground polyethylene containing undesirable ground contaminants has been used for making film. Various percentages and proportions of these materials have been attempted with the best success being found at rates where reprocessed plastic is at a rate greater than or equal to 50% and densified contaminated plastic not greater than 50%, based on shopping bags which are ground, yielding a very good quality plastic film which can be readily made into bags. It has been found that because of the ink in many of the shopping bags that the final product from the process is darker than would be acceptable in making light coloured products. Although this has not been reproduced it is well known to de-ink materials before processing. The reader is informed to de-ink if lighter coloured finished products are desirable. 100% contaminated plastic has been produced and does give a good end product. Specifications of the end product can be adjusted by including some % new materials or commercially available modifiers.

Referring now to FIG. 1 there is described a method of recovering the aforementioned waste plastic. In one embodiment described in the remainder of the detailed description of the preferred embodiments it has been found that a good source of raw materials exists in reprocessing waste poly bags or shopping bags. Therefore it is in this direction that much of the experimentation and effort to perfect and render to practice the method and following process has been directed.

Therefore in FIG. 1 the waste plastic bag is :received by the supermarket, containing undesirable contaminants as shown in the first block of FIG. 1. These bags are collected and handled by any conventional material handling system for example baling, compacting, shredding or the like. The plastic is then picked up by the reprocessing agent.

The waste plastic containing the undesirable contaminants is then ground to a size suitable for bulk handling either pneumatically or by other known bulk handling methods. For example the material may be ground to a size finer than 4 mesh so that it may be readily handled. After the material is handled and placed through the grinder it may be conveyed to a suitable hopper for collection of the raw materials to be fed to an extruder. This hopper may be of any known size and contain any conventional material handling equipment. For example a bulk silo or a container maybe provided with an auger at the outlet thereof to feed the material into a surge hopper in advance of the extruder.

It is important to recognize that in grinding the plastic stock none of the contaminants have been removed. The grinder therefore must be of suitable durability to grind abrasive materials such as for example, metal pop cans, or other contaminants similar to the nature of metals.

The material is then fed into an extruder which has heating elements located along the barrel thereof at numerous locations. The extruder used in the experiments carried out included a 2.5 inch barrel. The extruder is pre-heated to 205° C., which is the operating temperature, and pressurized to 5,000 PSI. The purpose of the extruder is to convert the polyethylene plastic to a plasticized state so that it may be readily handled prior to forcing the plastic under pressure into an in line comminuting device. The in line comminuting device which is a preferred embodiment therefore further comminutes the particle size of the undesirable contaminants contained with the plasticized plastic flowing through the process to a particle size so that the particles in one aspect of the invention will not plug the dies of a plastic film manufacturing line or interrupt the film drawing process. In order to effect this requirement therefore it is desirable to be able to vary the output of the comminuting apparatus. The contaminants are sized to insure that they do not adversely effect any process to which the recovered plastic material may be subjected to.

For example normally in the process at least a 20 mesh screen or breaker plate and presently a 40 mesh screen, is in line following the comminuting apparatus to prevent any large particles from passing on through to the next step in the process. However it is preferred that the recovered plastic material containing the undesirable contaminants be pelletized so that they may be inventoried and used as feed stock in the production of plastics products. Each particle therefore of the undesirable contaminants is divided so finely so as not to effect unduly adversely any finished product. Each particle of contaminants therefore is encapsulated with plastic and distributed randomly through the plastic. It has been found that the particles are less than 1 mm and in many cases in the order of 0.0015 inches in many of the experimental runs conducted. It is preferred that the pellets be manufactured first even if the products will ultimately be plastic bags or other molded products since in manufacturing the pellets one may readily supply the output as raw material to end users.

Products which may be made from the recovered plastics material with the finely divided undesirable contaminants are such things as garbage bags, garbage cans, plastic pipes, pails and shovels or other product in which such recovered plastics may have use.

Figure 1A:
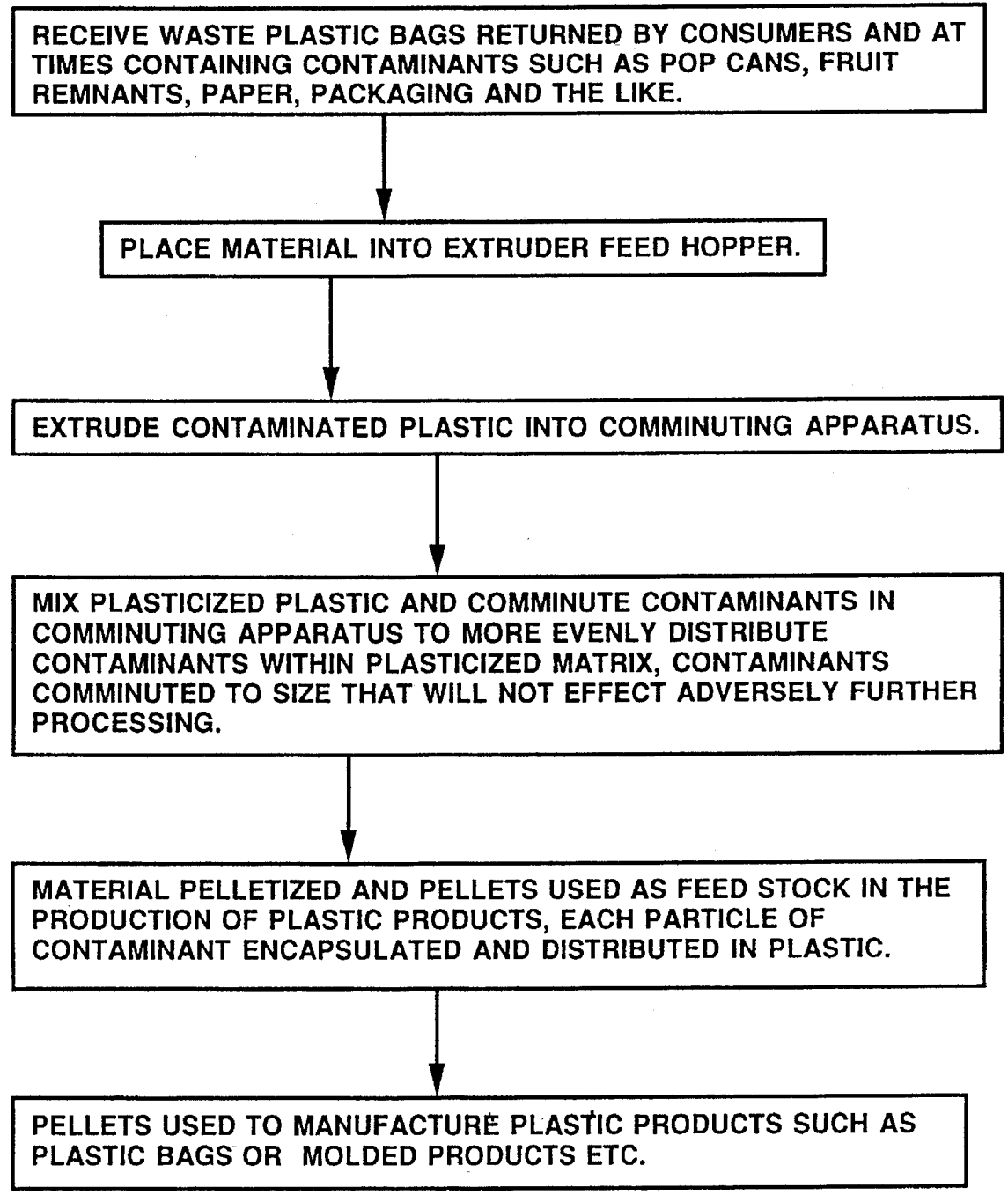
FIG. 1A is a flowchart indicating the steps within another method for reclaiming plastics materials considered to contain contaminants illustrated according to another preferred embodiment of the invention.

Referring to FIG. 1A there is illustrated a method similar in many respects to that which has been described in relation to FIG. 1 with the exception that grinding is not necessary before introducing the material into a twin screw extruder which because of the nature of the oppositely rotating screw augers tends to shred and handle the material sufficiently well so as to render grinding as unnecessary in most instances. The purpose of the twin screw extruder is to convert the polyethylene plastic to a plasticized state so that it may be readily handled prior to forcing the plastic under pressure into an in line comminuting device. The in line comminuting device, which in a preferred embodiment thereof further comminutes the particle size of the undesirable contaminants contained with the plasticized plastic flowing through the process to a particle size so that the particles in one aspect of the invention will not plug the dies of a plastic film manufacturing line or interrupt the film drawing process. The end uses and description relating thereto remains the same.

Figure 2:
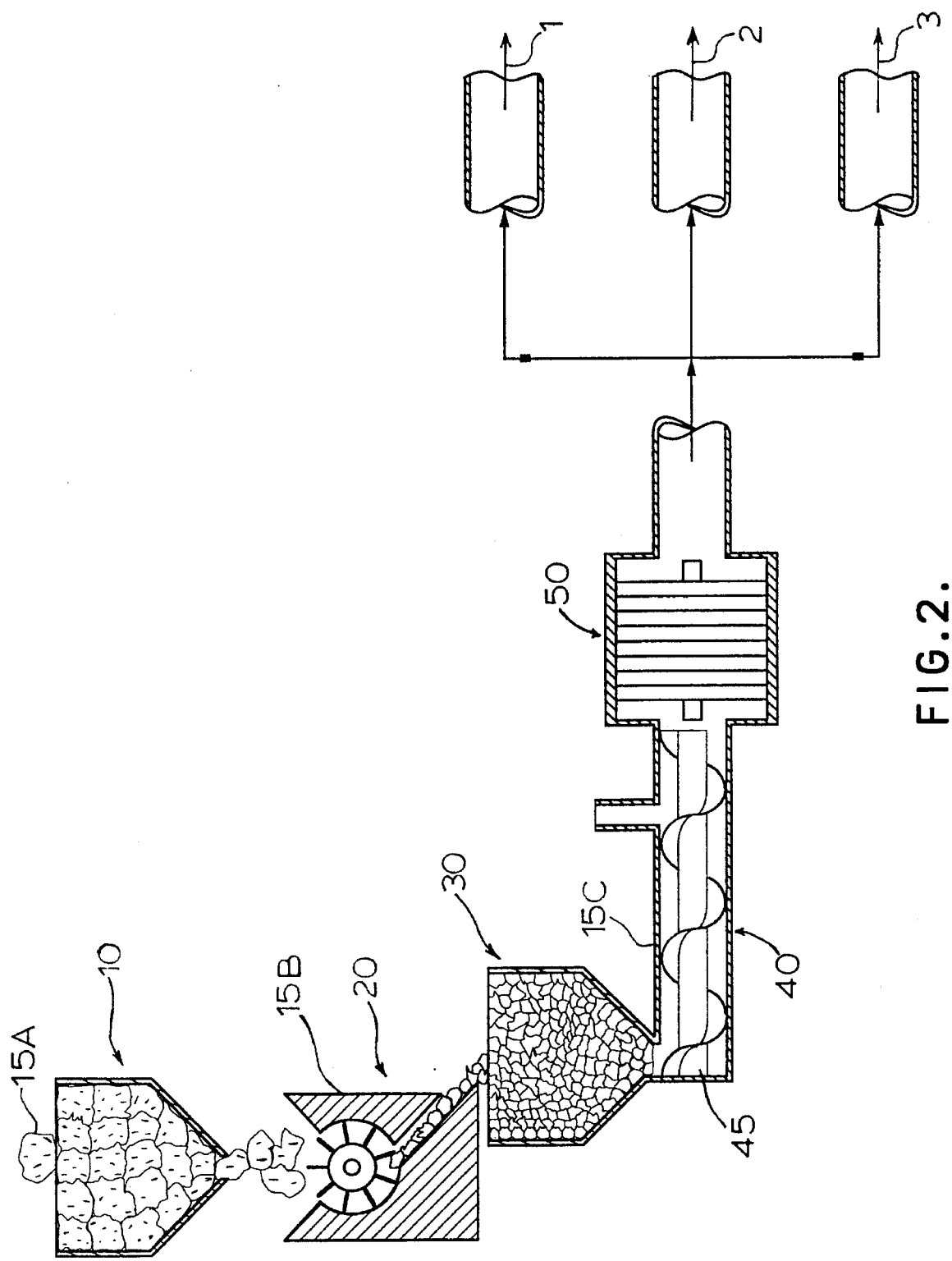
FIG. 2 is a process equipment flowchart of machinery used in one preferred embodiment of the invention to recover the unsorted waste plastic stream.

Referring now to FIG. 2 there is illustrated a schematic flowchart of the process for handling of waste grocery bags containing contaminants which are received and fed to the process 5. The waste grocery bags 15A are fed through a hopper 10 to a grinding apparatus 20. The grinding apparatus 20 therefore grinds the plastic bags containing the contaminants as shown into a coarse ground dry state, sized properly for the extruder and preferably to a grind of material that passes through a 4 mesh screen. The details of the grinding apparatus 20, have not been provided. However a suitable grinder may be Model Condor 1000 manufactured by FABRICA BONDENESE MACHINE of Italy, the specifications and construction for which are incorporated herein by reference. Irrespective of the make of the grinder should be rugged and be able to grind metal and perhaps stone.

A hopper 30 therefore is provided to collect the coarse ground plastic material containing the contaminants 15b. This material is then fed by gravity into an extruder which has a flight 45 for moving the material toward the comminuting device 50. Various heating sections (not shown) are provided within the extruder to conduct heat to the dry course ground material 15b so that the extruder 40 with the flights 45 can conduct the material in a plasticized state 15c together with the undesirable contaminants. The extruder may be Model FD65 manufactured by FUTURE DESIGN OF BRAMPTON, Ontario, Canada, and whose specifications and construction are incorporated herein by reference.

Figure 4:
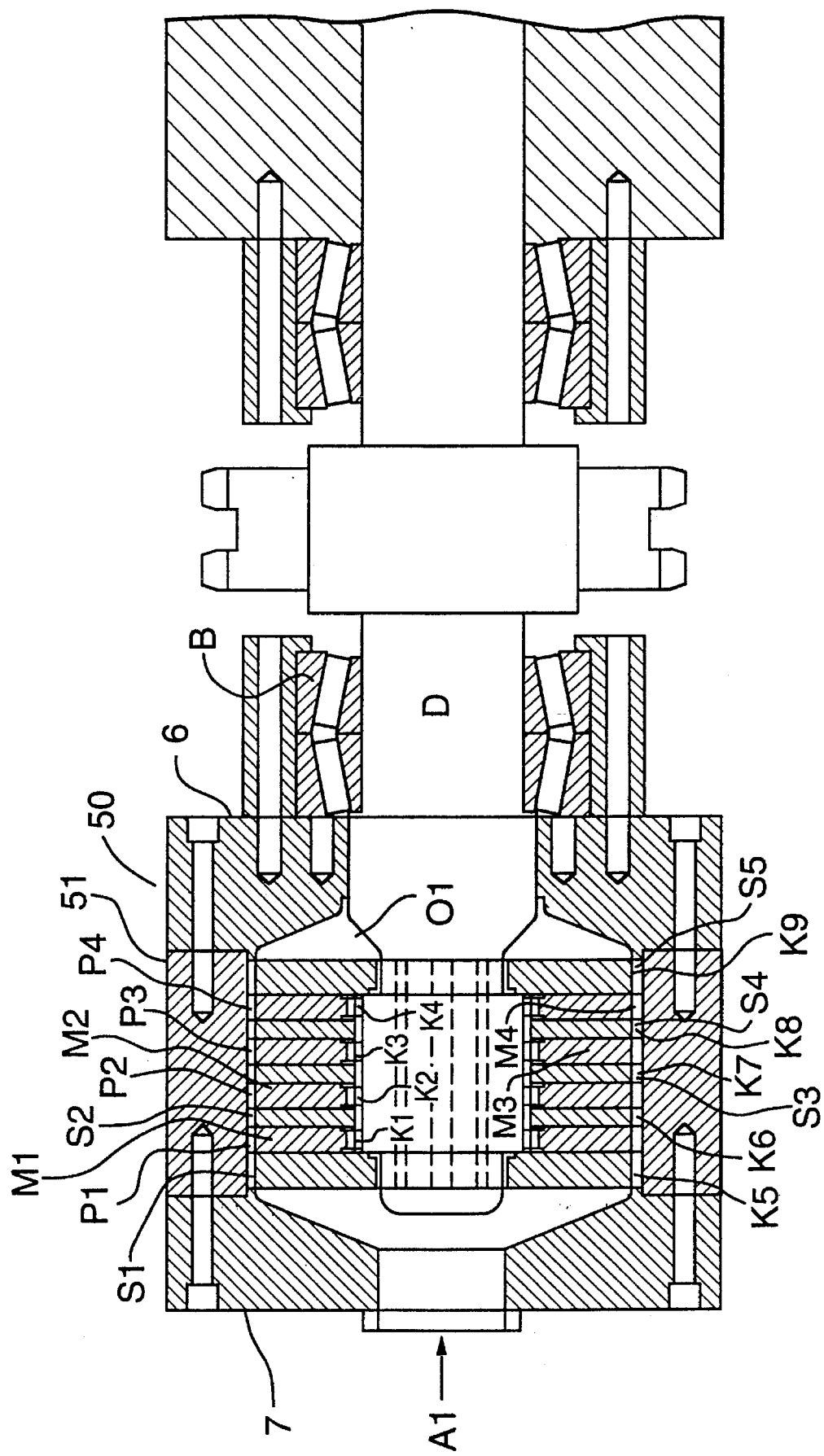
FIG. 4 is a cut away cross sectional view of the apparatus of FIG. 3 illustrating stationary and non-stationary plates contained within the housing and illustrated in a preferred embodiment of the invention.

In line with extruder 40 having various heating elements, also known in the art, is provided a comminuting device 50 which has a number of moveable (in this case rotatable), and stationary, plates as best seen in FIG. 4 which will be described hereinafter. The extruder and the comminuting device through to the end of the process provide a continuous process (passage) to ensure that the plastic remains in the desirable plasticized state. The comminuting device 50 therefore controls the size and dispersion of the contaminants in the matrix to provide a continuous output from the comminuting device to the respective process 1, 2 or 3 such that the contaminants are sized so that they pass through a 20 mesh screen easily and in the case of a film line, item 1, they do not plug the dies of the film line which are normally in the range of 65 thousandths of an inch to 85 thousandths of an inch or interrupt the film drawing process. It has been found that 40 mesh size which is 25 thousandths of an inch will sufficiently accomplish this task. This is one of the largest problems in recycling the polyethylene containing the contaminants since most film processors do not have the ability and resources to recover the plastic without excessive sorting. The present process includes the comminuting of the contaminants to a size less than 40 mesh and preferably below 1 mm in size and in most cases in the order of 0.0015 inches, with each particle being encapsulated in (being entirely surrounded by), the plasticized matrix. Therefore the comminuting device 50 feeds the plasticized matrix containing highly divided and comminuted contaminants to a preferred pelletizer die 3 wherein the material 15d is pelletized to be used in a molding process or the manufacture of plastic film at items 2 and 1 respectively. The film line may be manufacture FUTURE DESIGN, BRAMPTON, Ontario, Canada, Model No. FD1500, which specifications and details are hereby incorporated by reference. The injection molder may be Model No. DUOMAT 215, manufactured by ECKERT & ZIEGLER Gmbh. of Wesissenburg, Germany, which specifications and details are hereby incorporated by reference.

Figure 7:
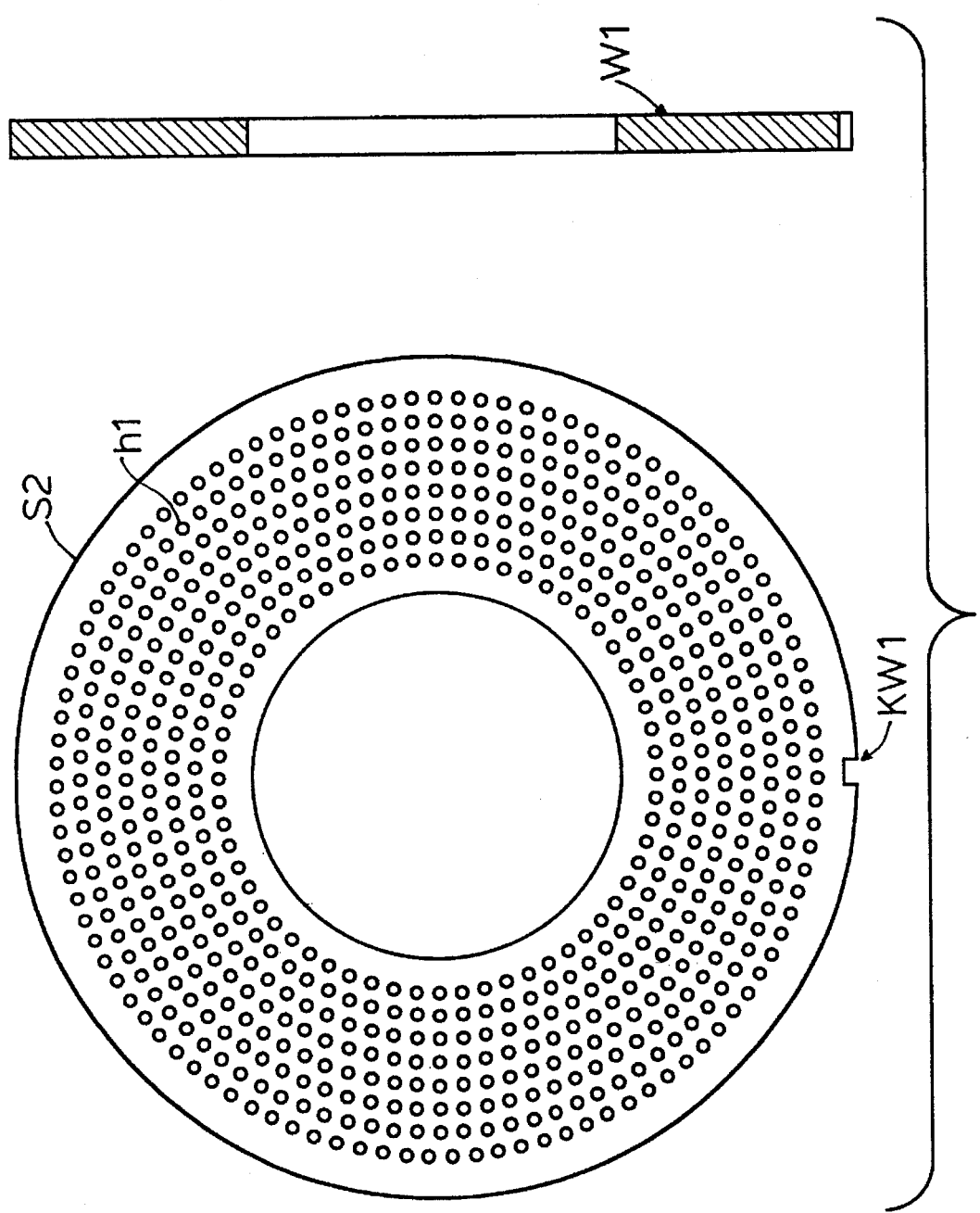
FIG. 7 is a front view of a stationary plate used in the comminuting device of FIG. 4.
Figure 8:
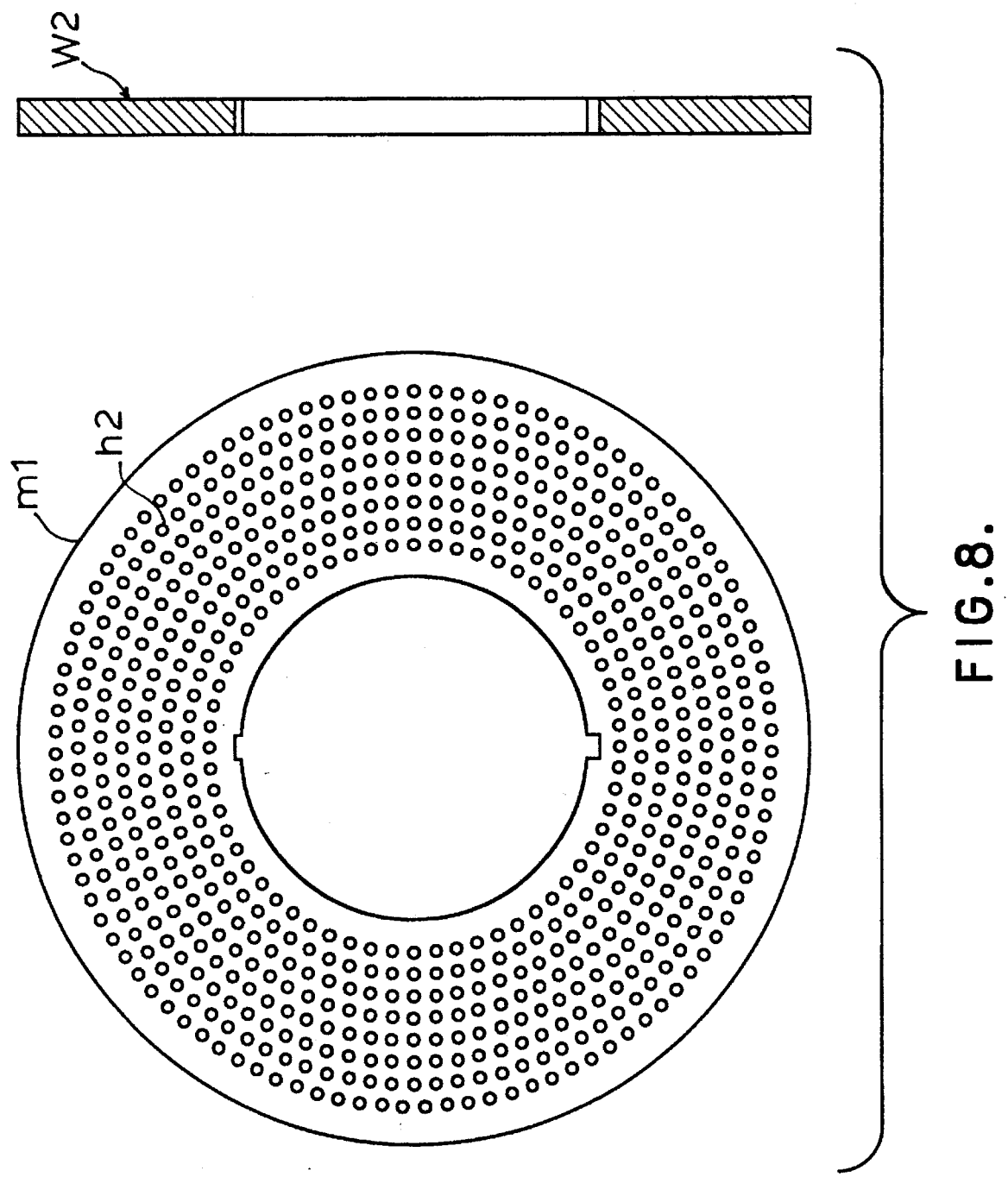
FIGS. 8 and 8a are a front views of rotating plates used in the comminuting device of FIG. 4.

The comminuting device is driven independently of the extruder of the preferred embodiment although the operation is continuous with the extruder. By providing a variable speed drive with the comminuting device 50 so that the revolutions per minute might be varied, and/or by varying the process throughput, and/or by varying the sizing of the plate openings as best seen in FIG. 7 and 8, the size of the particles of the undesirable contaminants may be easily controlled. Further the number of plates may increase the comminuting surface available within the comminuting device. Other comminuting devices not employing plates may work equally well with the plasticized plastic matrix providing they are able to reduce the size of the undesirable contaminants to the appropriate size so as not to affect unduly the finished product of recovered plastics.

Figure 2A:
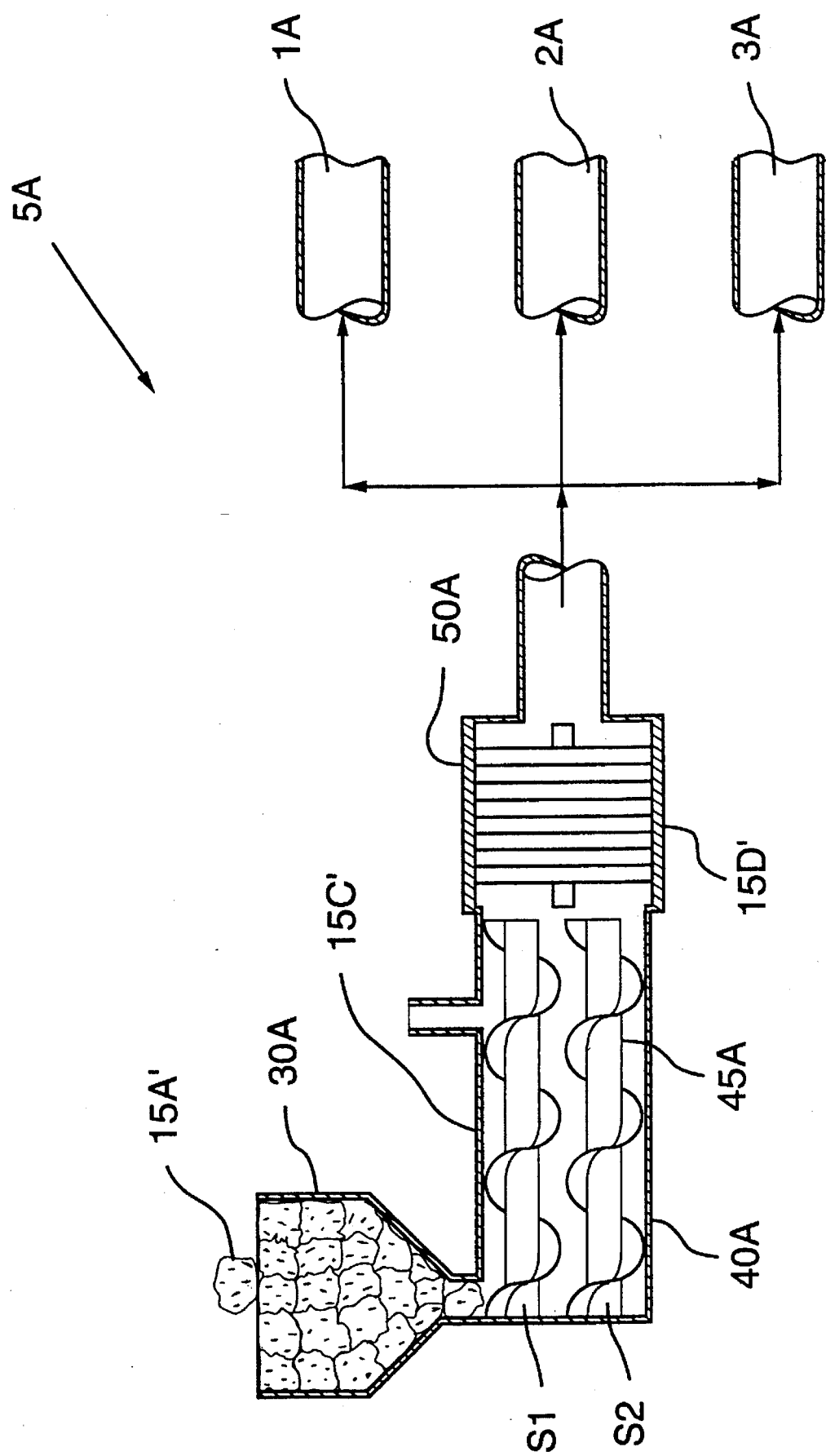
FIG. 2A is a process equipment flowchart of machinery used in another preferred embodiment of the invention to recover the unsorted waste plastic stream.

Referring now to FIG. 2A there is illustrated another schematic flowchart of the process for handling of waste grocery bags containing contaminants which are received and fed to the process 5a. The waste grocery bags 15a' are fed through a hopper 30a without the need for a grinding apparatus 20 as in FIG. 2. The hopper 30a therefore is provided to collect the unground plastics material containing the contaminants 15a'. This material is then fed by gravity into an twin screw extruder 40a which has two flights 45a moving in opposite directions (S1 and S2) pushing the material toward the comminuting device 50. As they do so, they reduce the size of the contaminants 15a'. Various heating sections (not shown) are provided within the extruder to conduct heat to the dry material 15c' so that the extruder 40a with the flights 45a including oppositely rotating screws S1 and S2 can conduct the material in a plasticized state 15c' together with the undesirable contaminants.

In line with extruder 40a having the various heating elements, which is known in the art, and may be Model DOKEX 2-500 manufactured by PROMAG, SWITZERLAND, is provided a comminuting device 50a which has a number of moveable (for example rotary), and stationary, plates as best seen in FIG. 4 which will be described hereinafter. It is important that the twin extruder and the comminuting device through to the end of the process be a continuous process (be in communication with one another) so as to ensure that the plastic remains at the desirable plasticized state. The comminuting device 50a therefore sizes the contaminants so that the output of the comminuting device to the respective process 1a, 2a or 3a is continuous with the contaminants being sized so that they pass through a 20 mesh screen easily and in the case of a film line, item 1a, they do not plug the dies of the film line which are normally in the range of 65 thousandths of an inch to 85 thousandths of an inch or interrupt the film drawing process. It has been found that 40 mesh which is 25 thousandths of an inch will sufficiently accomplish this task.

Figure 3:
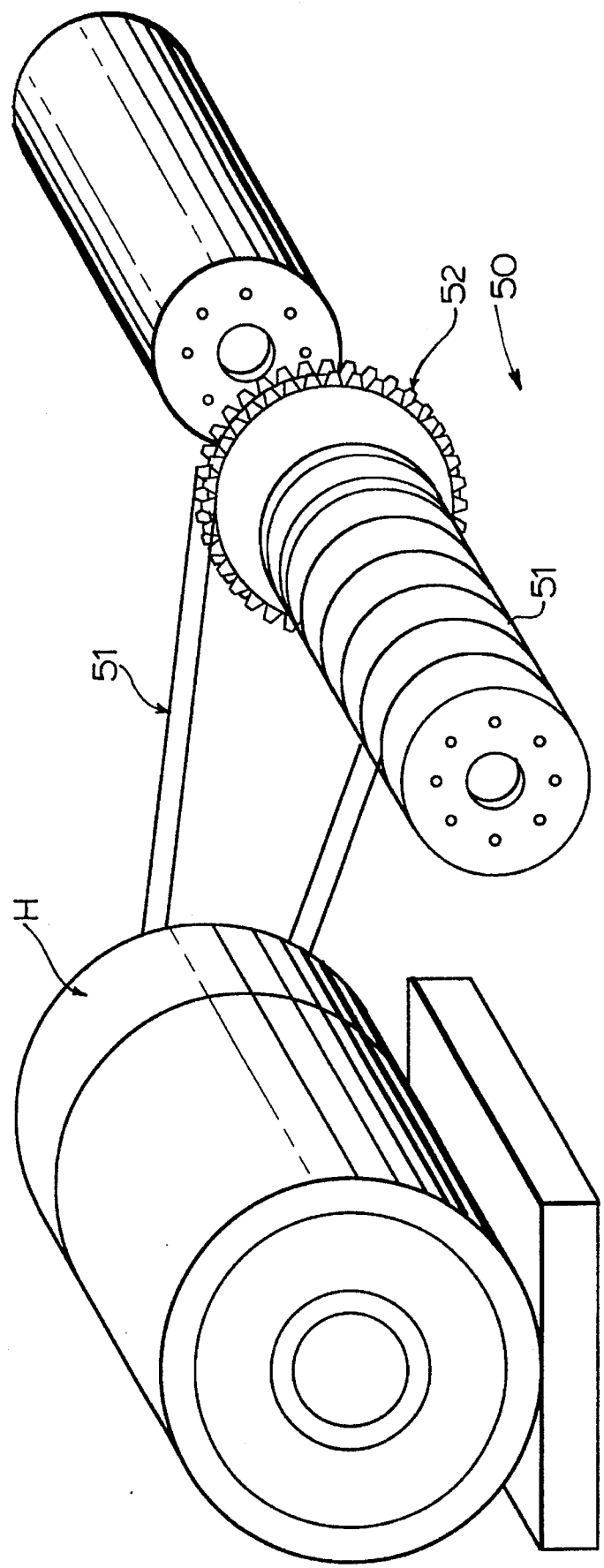
FIG. 3 is a general perspective view of components of the comminuting apparatus of FIG. 2.

Referring now to FIG. 3 there is illustrated in perspective the comminuting device 50 shown detached from the extruder at one end and detached from the process die for pelletizing at the other end. The comminuting device 50 is illustrated having a housing 51 which is readily attachable at one end to the extruder and at the other end to the process die. A drive H is provided which as previously discussed is a variable speed drive which is more convenient than changing the size of the sprocket 52 from time to time as processing requirements dictate.

Referring now to FIG. 4 there is illustrated in cross section the comminuting device 50 and the housing 51 having an opening contained therein through which a drive shaft D extends. The opening indicated as generally O1 contains a number of stationary and moveable plates, S1 to S5 being the stationary plates and M1 to M4 being the moveable plates. The moveable plates are keyed to the drive shaft D via the keys K1, K2, K3 and K4 within key-ways, not shown in FIG. 4, best seen in FIGS. 7 and 8. The key-ways KW2 therefore of FIG. 8 are used to secure the plates M1 to M4 on the shaft D. The stationary plates S1 to S5 are keyed to the barrel of the housing 51 at keys K5, K6, K7, K8 and K9. Spacers P1, P2, P3 and P4 are provided radially above each plate M1, M2, M3 and M4 which in fact are collars which circle the plate and keep the spaces between the stationary and moveable plates well defined.

Figure 4A:
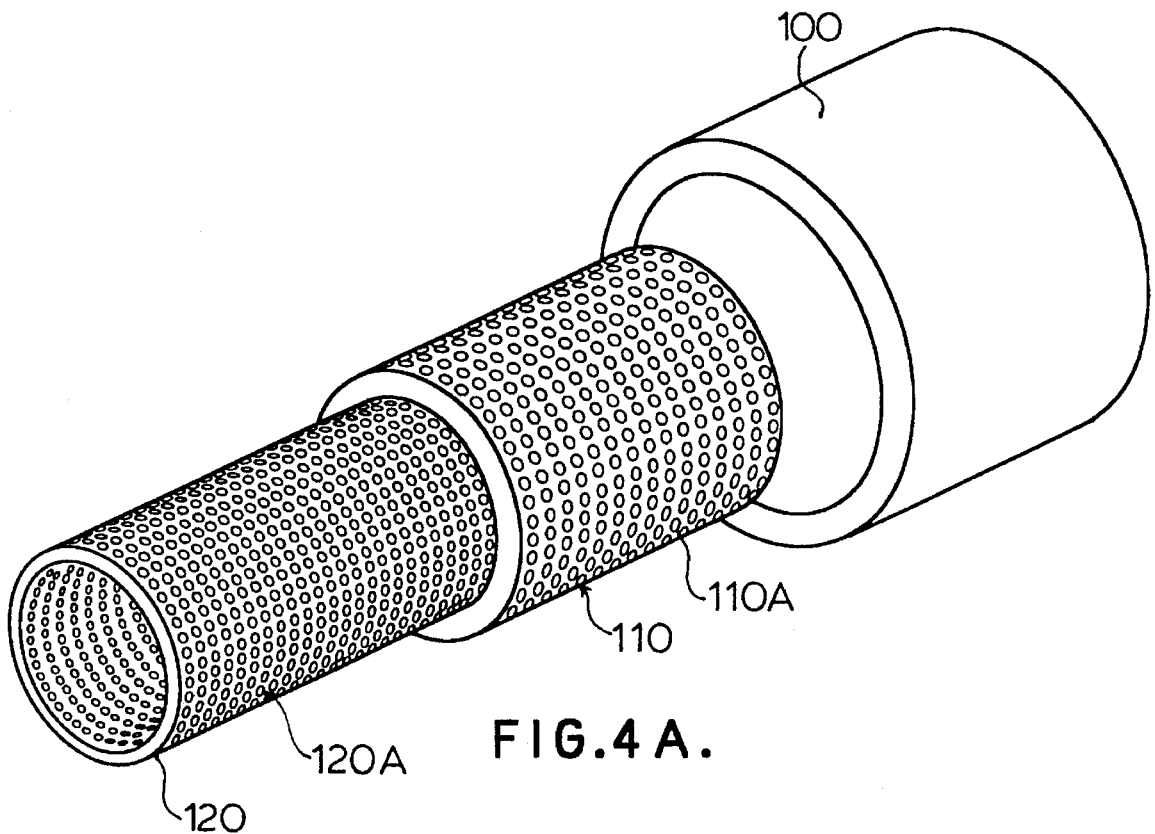
FIG. 4A is a schematic view of another comminuting apparatus with concentric cylinders having openings therein and illustrated in an alternative embodiment of the invention.

Referring now to FIG. 4A there is illustrated a schematic view of another comminuting apparatus 100 with concentric cylinders 110 and 120 having openings therein 110a and 120a which provide the configuration to perform the necessary comminuting of the particles between the inner diameter of the outer cylinder 110 and the outer diameter of the inner cylinder 120. The comminuting therefore works along the lines of the principles described in relation to FIG. 6. However to accomplish the task properly it will be necessary to provide a number of devices as illustrated in FIG. 4A in series to properly control the comminuting of the particle sizes or concentric cylinders (having a common axis) of reducing diameter some of which may be stationary and others moveable, so that there is relative movement between the cylinders.

Figure 4B:
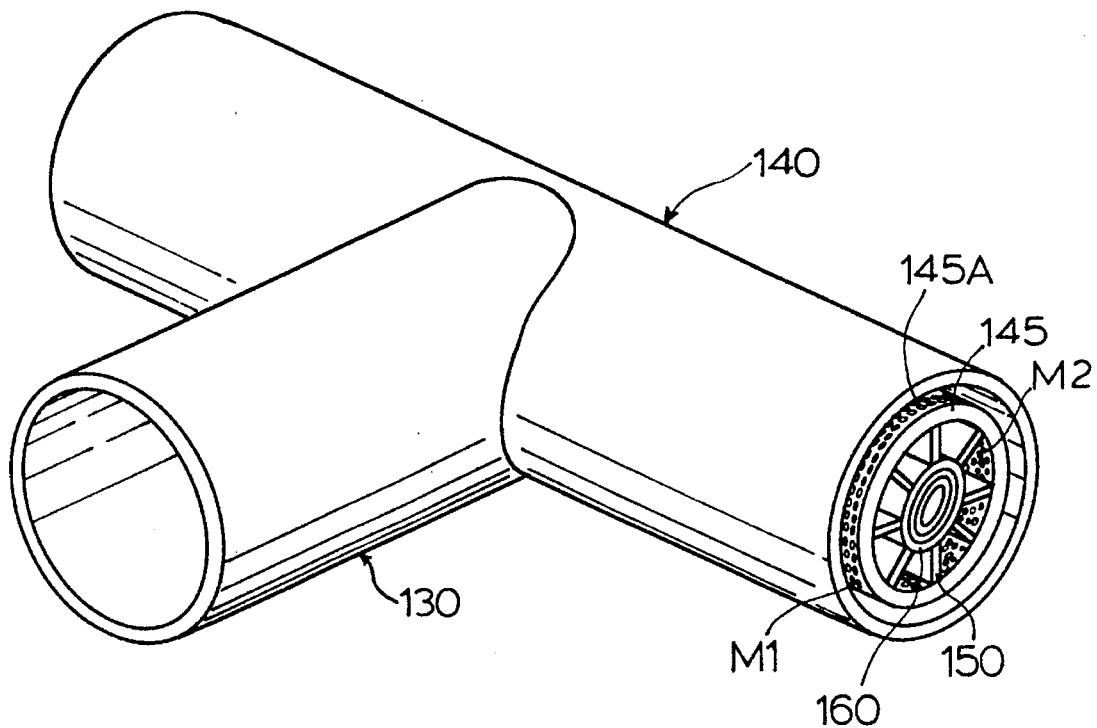
FIG. 4B is a schematic view of another comminuting apparatus with an outer cylinder having openings therein within which a number of radially extending cutting blades rotate, illustrated in a further alternative embodiment of the invention

FIG. 4B is a schematic view of still another comminuting apparatus with an outer cylinder 140 fed from a connector 130 from the extruder wherein an outer drum 145 having openings 145a is provided within which a number of radially extending cutting blades 150 rotate which provide the necessary comminuting of the particles between the inner diameter of the outer cylinder 145 and the cutting blades 150 of the inner wheel 160 as the plasticized material passes through the holes and engages the blades 150. The comminuting therefore works along the lines of the principles described in relation to FIG. 6 with the material M2 containing finer particle sizes than material M1. However to accomplish the task properly it will be necessary to provide a number of devices as illustrated in FIG. 4B in series to properly control the comminuting of the particle sizes.

Referring now to FIGS. 7 and 8 there is illustrated the design of the stationary plates in FIG. 7 and the moveable plates in FIG. 8. Openings therefore $h_1$ are provided on the exemplary plate S2 which has a key-way KW1 provided for attachment to the barrel of the comminuting device 50. The width of the plates is ½ inch and is manufactured from substantial tool grade steel which plates are finished flush and having substantially zero clearance when installed within the comminuting device. Each plate has approximately 650 holes provided in the patterns shown which are compatible with the design of the movable plate M1 of FIG. 8 having holes $h_2$ as indicated. The plate M1 being exemplary of all moveable plates has a key-way KW2 for attachment to drive shaft D of FIG. 4. The holes are defined as generally circular having predetermined diameters and positions. The holes in FIGS. 7 and 8 therefore are defined from the inner diameter which is 5 inches plus or minus a thousandths of an inch and are defined in 8 concentric rings of openings with the first ring providing 60 holes separated by 6 degrees and with the eighth ring providing 103 holes separated by 3 degrees 30 minutes. These are identically positioned for both the stationary plates of FIGS. 7 and the moveable plates of FIG. 8. The stationary plates of FIG. 7 are manufactured from ½ inch metal plate, wherein the moveable plates are manufactured from ¾ inch plate because of the fact that the moveable plate is keyed to the shaft which has less of a mechanical advantage then the outer diameter of the plates for the stationary plates which are keyed to the barrel of the housing 51. The holes are "in diameter.

Figure 6:
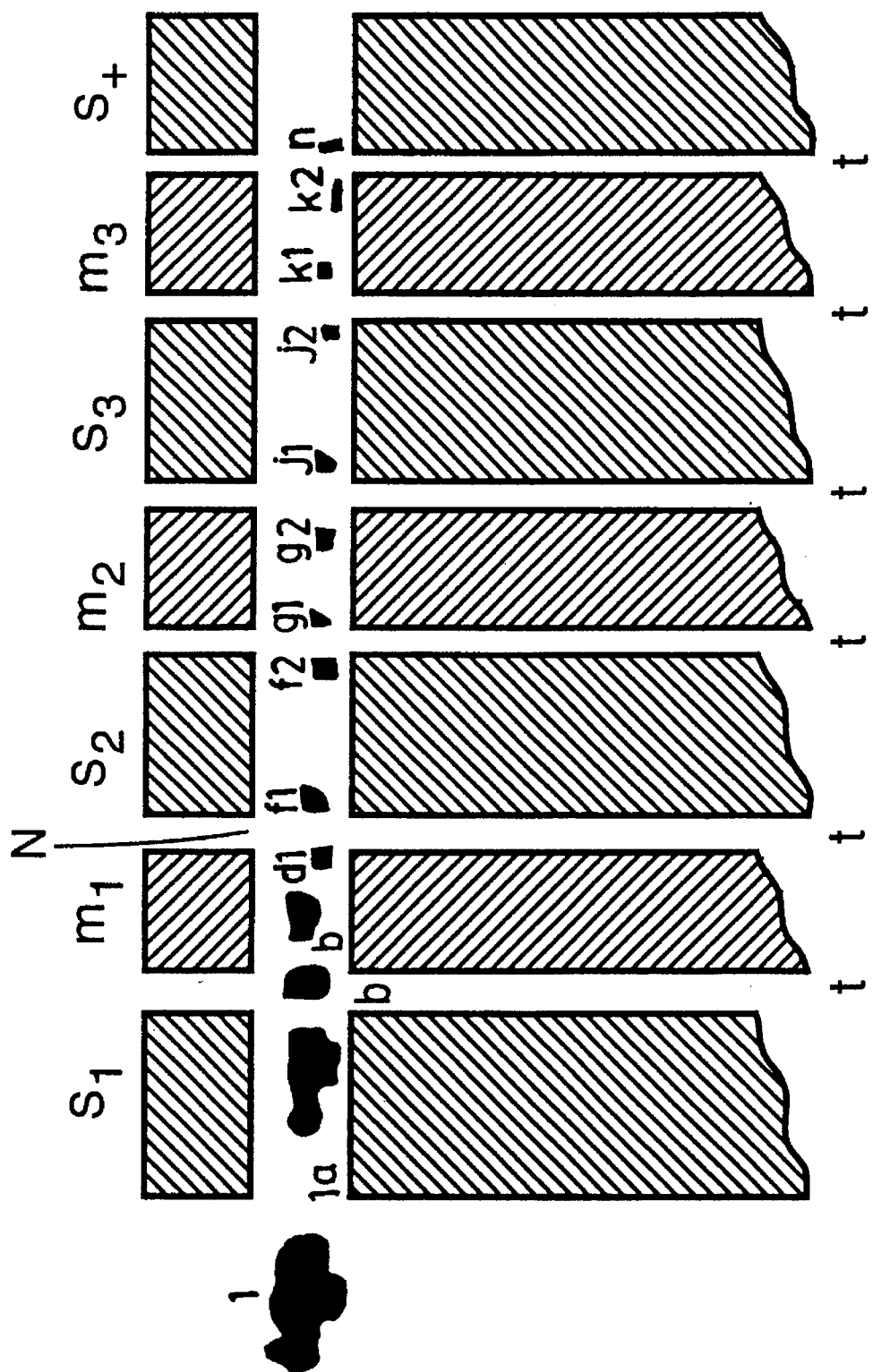
FIG. 6 is a schematic diagram of the size reduction process of contaminants that takes place in the comminuting device of FIG. 4 as the openings of the moveable plates pass openings of other plates illustrated in a preferred embodiment of the invention.
Figure 8A:
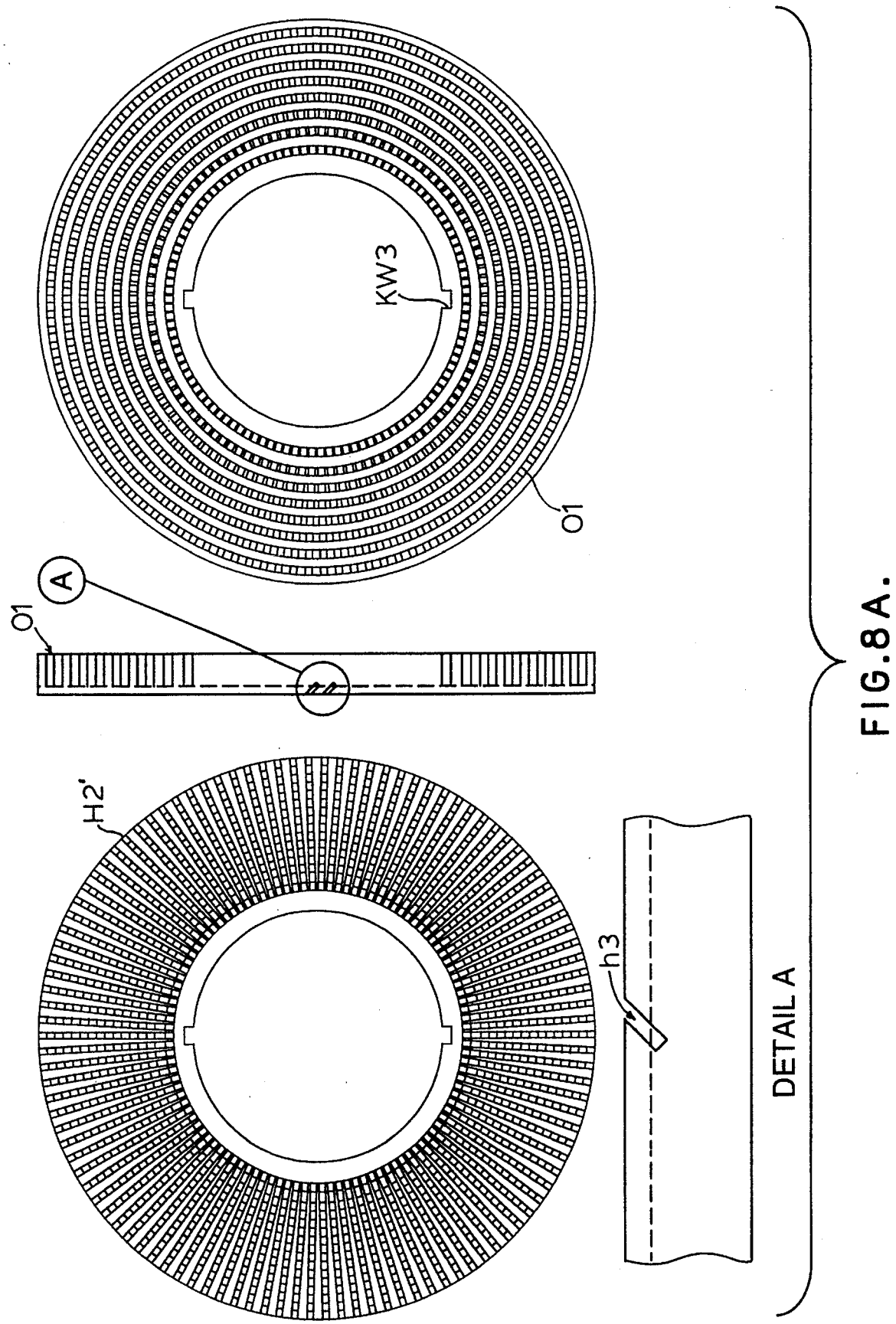

An alternative to the plates of FIGS. 7 and 8 is illustrated in relation to FIG. 8a. The effective principals of FIG. 8a to the reduction in size of the contaminants as described in relation to FIGS. 6 are identical. The fastening of the moveable plate to the rotating shaft via a key and key-way KW3 is identical to that of FIG. 8. Radial openings H2' therefore are provided, on one side of the plate which open into slots H3 bounded by the cutting surfaces. The slots and shearing surfaces therefore are angled at approximate 30° degrees to the horizontal with the openings 0.1 disposed on the other side of the slots, on the other side of the plate, and providing passage for the plasticized material to pass through the openings and thereby be sheared proximate the junction of the stationary and moveable plates, as described in relation to FIG. 6. Again as with FIG. 8 the openings of FIGS. 8a are arranged in concentric rings, a total number 8, and the moveable plates are manufactured from Tool Grade Steel at ¾" thickness, since the moveable plate is keyed to the driven shaft, and has less mechanical advantage then the stationary plates as previously described. It is recommended that the cutting surfaces of FIG. 8a be sufficiently thick so as to not bend or deform during operation thereof, as a result of shearing metal particles. However, the structure of FIG. 8 is much preferred, although the structure of FIG. 8a would work.

The holes therefore provide the cutting of the undesirable contaminants as the extruder feeds the 205° C. plasticized plastic containing the undesirable contaminants at 5,000 PSI to the comminuting device which contains in essence as best seen in FIG. 4 four movable plates. If we assume that the pressure is coming from the direction shown A1 then because of the tolerances in manufacture of the plates the moveable plates will tend to move toward the leeward edges, where most of the grinding is done, since a very small gap will appear between the stationary plates and the pressurized edges of the moveable plates. For example plate M1 will grind primarily on the right hand edge adjoining the stationary plate S2 although some grinding will take place on the left hand edge adjoining stationary plate S1. This is expected since zero clearance is not recommended since the machine will take a great deal of horsepower to overcome the internal friction thereof. However the tolerances are kept small so that some comminuting does occur on the pressurized edge. It is recommended that plates S1 to S5 and M1 to M4 be ground flush and be nitrated and made from tool grade steel. The details of the grinding or comminuting will be described in relation to FIG. 6.

Referring now to FIG. 6 there is described in schematic form the comminuting of a particle 1 as it passes through a selection of plates. As indicated therefore the particle 1 enters the stationary plate S1 at the first opening thereof. The particle as it engages the moveable plate opening M1 instantaneously will be sheared to create a remnant 1a remaining in the hole of the plate S1 with a divided portion b being carried through under 5,000 PSI with the plastic matrix. The particle b therefore in being moved by the plastic matrix will move through the opening M1 until the particle reaches the other end of the opening of the plate M1 whereat because of its engaging edge with hole 2 of plate S2, which is 3 degrees 30 minutes forward of the hole 1 of plate S1, the particle b will be divided into portions d1 and f1, with d1 remaining within the opening of plate M1 and f1 passing on through to the opening of plate S2. It is assumed in FIG. 6 that the reader is looking at a openings within the ring number 8 containing 103 openings of FIGS. 7 and 8 disposed 3 degrees and 30 minutes from the first opening of stationary plate S1. The particle f1 will therefore move ahead under pressure to the abutting edges of the moveable plate M2 which for all intents and purposes, we will assume happens instantaneously, so that the opening of plate M2 therefore is opening number 3 which is 7 degrees disposed from the opening of stationary plate S1. The particle f1 is therefore divided into a remnants f2 and a smaller particle g1 which moves on to that opening disposed 7 degrees from the original opening of plate S1. Again assuming this happens instantaneously the particle g1 will then move ahead to the stationary plate S3 and the effective shearing of the particle thereat at the boundary of M2 and S3 so that g1 therefore becomes a remnants g2 and a smaller particle j1 contained within the opening S3 which is disposed at 10 degrees 30 minutes of the opening of plate S1. The particle j1 will therefore move onto the boundary of the movable plate M3 whereat the particle j1 will be divided into a remnant j2 which remains in the opening of plate S3 and in other finely divided particle k1 within the opening M3 which is disposed at 14 degrees from the opening of the plate S1. The particle k1 will therefore be reduced to a remnant k2 at the boundary of plate S4 as described in relation to the previous description so that a remnant k2 remains within the opening M3 and a small particle n is contained with the opening S4 (rotation of 17 degrees 30 minutes from plate S1). The small remnants S4 will then be carried on through to the plate M4 and through the stationary plate S5 which will result in two more cuts over a total of 21 degrees. Therefore in following the particle 1 through comminuter 50 it can be seen how quickly the contaminant material can be divided and appropriately sized through the process.

It must be understood by the reader when referring to FIG. 6 that the position of the opening in screen S1 is not in line with the openings of M1, S2, M2 S3, M3 and S4 at the same time instantaneously. The purpose of FIG. 6 is to illustrate and describe in relation to the illustration the reduction of the particle in a continuous manner with the openings of each of the various stationary and moveable plates being offset by predetermined numbers of the degrees as described above.

Figure 5:
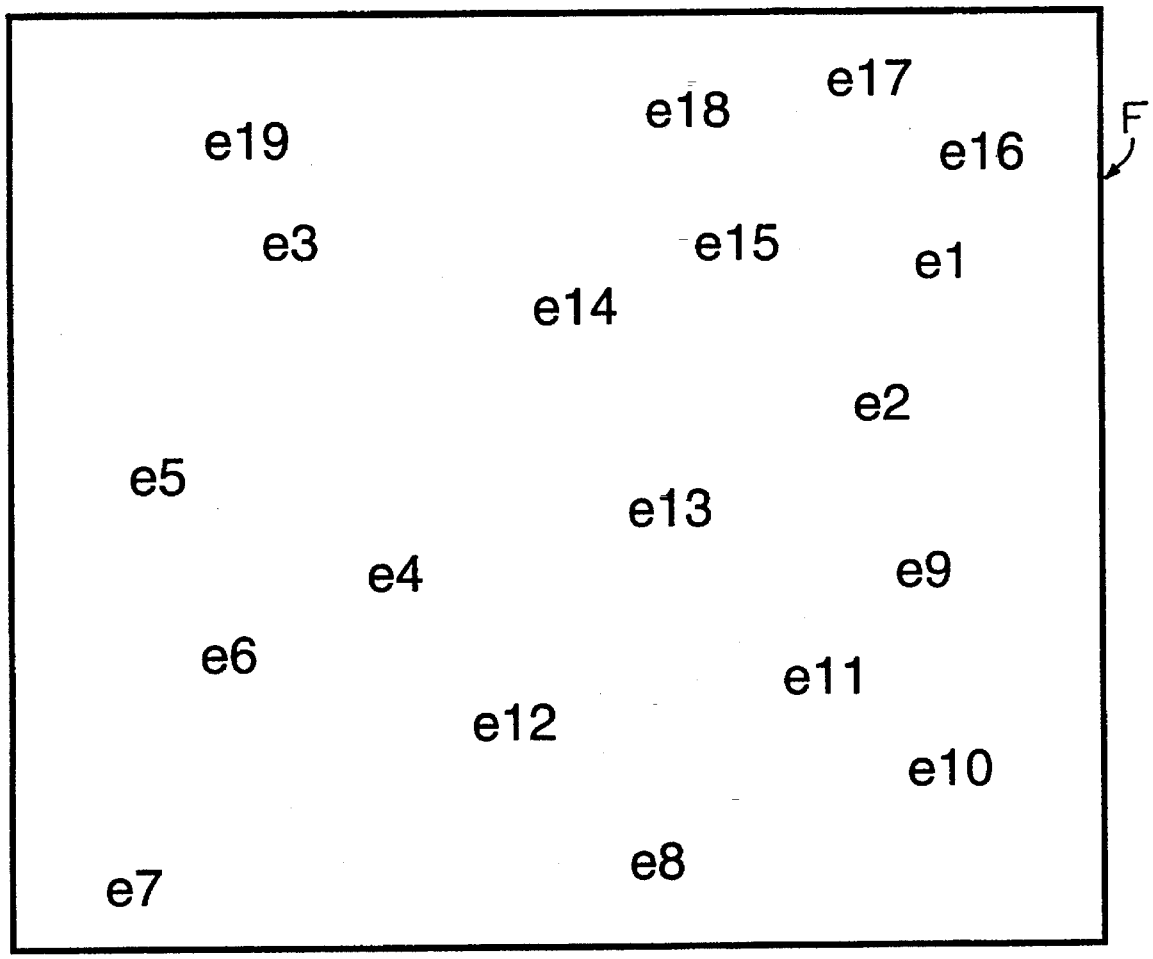
FIG. 5 is a partially cut away perspective view of a film product of the process of FIG. 2 and the method of FIG. 1 used to make plastic bags, a cut-away portion of which is illustrated in a preferred embodiment of the invention.

As a result of the finely divided particle size of the contaminants, it has been found that a plastic film f a portion of which as seen in FIG. 5 can be manufactured with particles much less than 1 mm or about 39 one thousandths of an inch. With a specification of the grind size being less than 20 mesh or 50 thousandths of an inch it can readily be seen that the particles e1 to e19 will not plug the dies of a film line which are generally between 65 and 85 thousandths of an inch. Nor will such particles accumulate in one position line but be dispersed throughout the product so as not to affect unduly the product's qualities. Film has been manufactured and found to be readily formable into a useful garbage bag which is quite strong.

Figure 9:
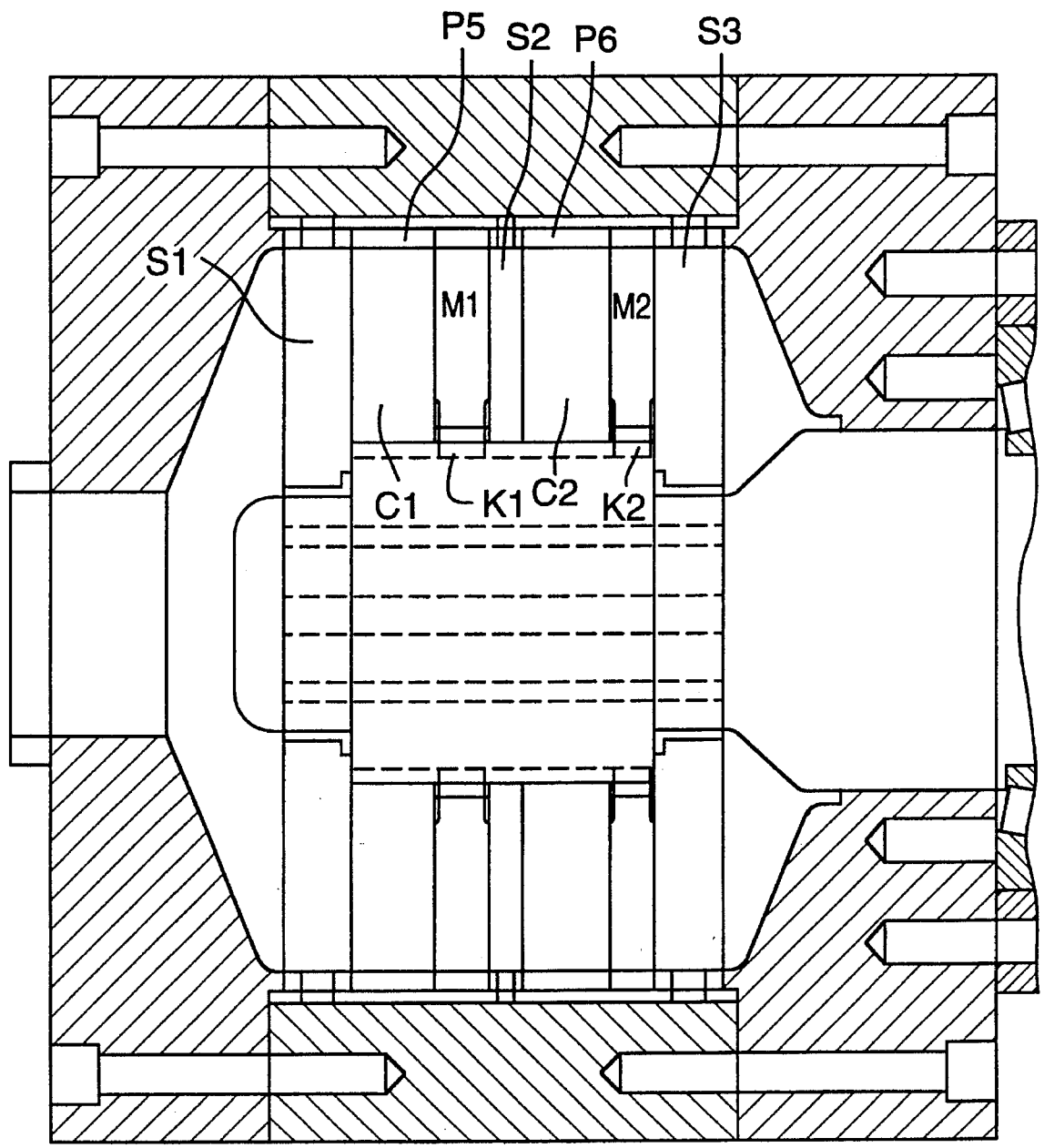
FIG. 9 is an alternative embodiment of the invention.

Referring now to FIG. 9 there is illustrated an alternative embodiment of the comminuting device of the instant invention. In the case where metal may be carried in the waste product stream it is highly desirable to provide a relief chamber c1 and c2 within the comminuting device to ensure that the metal does not bind the comminuting machine. Spacers p5 and p6 therefore are provided to ensure that a proper relief chamber is provided, the spacers running between the stationary plates S1, S2 and S3 and thereby provide the relief chambers between the moveable plate M1 and the stationary plate S1, and the moveable plate M2 and the stationary plate S2. The keys k1 and k2 are provided as per FIG. 4 and all other aspects remain identical. Thus the contaminants are comminuted to provide a result similar to that shown in FIG. 6. Similarly use of the comminuting devices of FIGS. 4A and 4B will achieve similar results (provided in FIG. 4A sufficient concentric cylinders bearing opens therethrough are used or series of cylinders are used) and (sufficient serially disposed comminuting devices are used as shown in FIG. 4B).

It is very important when considering a film line that the process comminutes contaminants so fine that it minimizes the aspect of plugging the film dies which are usually in the range between 65 and 85 thousandths of an inch which if plugged will create a die line if contaminates were too coarse. If it is determined that the contaminants which are undesirable are not ground to a fine enough size the RPMS (revolutions per minute) may be increased on the comminuting device or the process may be slowed down somewhat or both, or the number of plates may be changed or the diameter of the plates may be changed so that more cuts are achieved with more holes.

This results in a plastic product therefore manufactured which includes a matrix of plastic material which has contained therein encapsulated sized undesirable contaminants completely surrounded by plastics material and so sized so as not to degrade unduly the properties of the finished plastic product being manufactured such as plastic films, pales, shovels, containers, plastic pipe or the like whatever product can be made.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. A method for reclaiming plastic, which contains undesirable contaminants said method comprising:
   (a) accumulating said plastic,
   (b) heating and pressurizing said plastic to a predetermined temperature and pressure so as to plasticize said plastic within which said contaminants are contained,
   (c) delivering said plasticized plastic containing said contaminants to a comminuting device, mixing the plasticized plastic and at the same time shearing the contaminants progressively as the plastic passes through the comminuting device, thus comminuting said contaminants to a very fine predetermined particle size, thereby providing finely dispersed particles of the contaminants of predetermined size throughout the plasticized plastic,
   wherein each finely comminuted particle of contaminant is encapsulated by plastic and being separated from one another, to allow products to be manufactured from the reclaimed plastic.

2. The method of claim 1 wherein the plastic when received is ground on site to a predetermined coarse particle size to grind both the plastic and the undesirable contaminants prior to heating and pressurizing the plastic.

3. The method of claim 1 wherein the heating and pressurizing of said plastic is carried out in a twin screw extruder.

4. The method of claims 1, 2 or 3 wherein the comminuting device is an apparatus having at least one device moving in relation to at least another device, each of the devices having means to allow passage of plasticized plastic wherein said plasticized plastic containing said contaminants passes consecutively through said devices.

5. The method of claim 4 wherein said devices further comprise plates.

6. The method of claim 5 wherein the plates have openings therein.

7. The method of claim 4 wherein the contaminants are so fine that they minimize plugging of the gaps of film dies, which if plugged would create a die line in the film manufactured.

8. The method of claim 1 wherein said plasticized plastic containing said finely comminuted and divided contaminants is pelletized to provide feed stock for any further plastic forming process.

9. The method of claim 8 wherein said pellets are used to manufacture plastic film.

10. The method of claim 9 wherein the plastic film manufactured by said method is used for the manufacture of plastic garbage bags.

11. The method of claims 1, 8, 9 or 10 wherein the contaminants are so fine that they minimize plugging of the gaps of film 12. The method of claim 8 wherein said pellets are used as raw material for a molding process dies.

13. The method of claim 1 wherein the particle size is less than 20 mesh.

14. The process of claim 1 wherein said comminuting device ,comprises a machine having a housing, said housing having a space defined therein wherein a driven shaft is disposed, said housing and driven shaft for supporting a number of devices at least one of which is moveable relative to at least another of the devices wherein plasticized plastic having carried therewith contaminants therein pass through openings within said devices resulting in the shearing of the contaminants as the plasticized plastic moves from openings in one device to openings in another device, said shearing occurring between the relatively moveable devices wherein the machine provides a mixture of plasticized plastic and finely ground contaminants as output from said machine.

15. The process of claim 14 wherein the devices for comminuting comprise at least one stationary plate and at least one non-stationary plate, said at least one stationary plate being adjacent said at least one non-stationary plate and said at least non-stationary plate being driven by said shaft.

16. The process of claim 15 wherein said at least one stationary plate comprises a plurality of stationary plates and said at least one non-stationary plate comprises a plurality of non-stationary plates.

17. The process of claims 14, 15, or 16 wherein the contaminants are so fine that they minimize plugging of the openings of film dies, which if plugged would create a die line in the film manufactured.

18. The process of claims 15 or 16 wherein the plasticized plastic having carried therewith contaminants therein passes through the stationary and non-stationary plates through openings in adjacent plates when the openings are aligned.

19. The process of claim 18 wherein the contaminants are so fine that they minimize plugging of the openings of film dies, which if plugged would create a die line in the film manufactured.

20. The process of claims 15 or 16 wherein said machine includes a predetermined number of sets of stationary and non-stationary plates.

21. A method for reclaiming plastic, which contains randomly undesirable contaminants, said method comprising:

(a) delivering the plastic in a plasticized state, which plastic contains the contaminants, to a comminuting device, (b) mixing the plasticized plastic and at the same time shearing the contaminants progressively as the plastic passes through the comminuting device, (c) comminuting said contaminants to a very fine predetermined particle size, (d) thereby providing finely dispersed particles of the contaminants of predetermined size throughout the plasticized plastic, wherein each finely comminuted particle of contaminant is encapsulated by plastic and being separated from one another to allow products to be manufactured from the reclaimed plastic.

22. The method of claim 21 wherein the comminuting device is an apparatus having at least one device moving in relation to at least another device, each of the devices having means to allow passage of plasticized plastic, wherein said plasticized plastic containing said contaminants passes consecutively through said device.

23. The method of claim 22 wherein said devices further comprise plates.

24. The method of claim 23 wherein the plates have openings therethrough.

25. The method of claim 21 wherein the particle size is less than 20 mesh.

26. The method of claim 21 wherein said plasticized plastic containing said finely comminuted and divided contaminants is pelletized to provide feed stock for any further plastic forming process.

27. The method of claim 26 wherein said pellets are used to manufacture plastic film.

28. The method of claim 27 wherein the plastic film manufactured by said method is used for the manufacture of plastic garbage bags.

29. The method of claim 26 wherein said pellets are used as raw material for a molding process.

30. The method of claim 21 wherein said comminuting device comprises a machine having a housing, said housing having a space defined therein wherein a driven shaft is disposed, said housing and driven shaft for supporting a number of devices at least one of which is moveable relative to at least another of the devices wherein plasticized plastic having carried therewith contaminants therein pass through openings within said devices resulting in the shearing of the contaminants as the plasticized plastic moves from openings in one device to openings in another device, said shearing occurring between the relatively moveable devices wherein the machine provides a mixture of plasticized plastic and finely ground contaminants as output from said machine.

31. The process of claim 30 wherein the devices for comminuting comprise at least one stationary plate and at least one non-stationary plate, said at least one stationary plate being adjacent said at least one non-stationary plate and said at least non-stationary plate being driven by said shaft.

32. The process of claim 31 wherein said at least one stationary plate comprises a plurality of stationary plates and said at least one non-stationary plate comprises a plurality of non-stationary plates.

33. The process of claims 30 or 31 wherein the plasticized plastic having carried therewith contaminants therein passes through the stationary and non-stationary plates through openings between adjacent plates when the openings are aligned.

34. The process of claims 30 or 31 wherein said machine includes a predetermined number of sets of stationary and non-stationary plates.

\* \* \* \* \*